(12) United States Patent
Masaki et al.

(10) Patent No.: US 9,255,319 B2
(45) Date of Patent: Feb. 9, 2016

(54) CR-CONTAINING AUSTENITIC ALLOY TUBE AND METHOD FOR PRODUCING THE SAME

(75) Inventors: Yasuhiro Masaki, Osaka (JP); Masahito Tasaka, Suita (JP); Manabu Kanzaki, Amagasaki (JP); Akihiro Uehira, Kashiba (JP); Shoji Kinomura, Takarazuka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 166 days.

(21) Appl. No.: 13/819,072

(22) PCT Filed: Aug. 12, 2011

(86) PCT No.: PCT/JP2011/068414
§ 371 (c)(1),
(2), (4) Date: May 2, 2013

(87) PCT Pub. No.: WO2012/026344
PCT Pub. Date: Mar. 1, 2012

(65) Prior Publication Data
US 2013/0206272 A1    Aug. 15, 2013

(30) Foreign Application Priority Data
Aug. 26, 2010 (JP) ................... 2010-189111

(51) Int. Cl.
| | | |
|---|---|---|
| C23C 8/18 | (2006.01) | |
| F16L 9/02 | (2006.01) | |
| C22C 19/05 | (2006.01) | |
| G21D 1/00 | (2006.01) | |
| C21D 6/00 | (2006.01) | |
| C21D 8/10 | (2006.01) | |
| C22C 38/00 | (2006.01) | |
| C22C 38/02 | (2006.01) | |
| C22C 38/04 | (2006.01) | |
| C22C 38/42 | (2006.01) | |
| C21D 9/08 | (2006.01) | |
| C22F 1/00 | (2006.01) | |
| C22F 1/10 | (2006.01) | |
| G21F 9/28 | (2006.01) | |
| C22C 38/58 | (2006.01) | |

(52) U.S. Cl.
CPC . *C23C 8/18* (2013.01); *C21D 6/002* (2013.01); *C21D 8/10* (2013.01); *C21D 9/08* (2013.01); *C22C 19/05* (2013.01); *C22C 19/058* (2013.01); *C22C 38/001* (2013.01); *C22C 38/02* (2013.01); *C22C 38/04* (2013.01); *C22C 38/42* (2013.01); *C22C 38/58* (2013.01); *C22F 1/00* (2013.01); *C22F 1/10* (2013.01); *F16L 9/02* (2013.01); *G21D 1/006* (2013.01); *G21F 9/28* (2013.01); *Y02E 30/40* (2013.01)

(58) Field of Classification Search
None
See application file for complete search history.

(56) References Cited

U.S. PATENT DOCUMENTS

| | | | |
|---|---|---|---|
| 6,488,783 B1 | 12/2002 | King et al. | |
| 2006/0177679 A1* | 8/2006 | Anada et al. | ............... 428/472.1 |
| 2009/0123775 A1* | 5/2009 | Kanzaki et al. | ............... 428/586 |

FOREIGN PATENT DOCUMENTS

| | | |
|---|---|---|
| CA | 2420229 | 3/2002 |
| CA | 2657782 | 1/2008 |
| EP | 1647609 | 4/2006 |
| EP | 2 009 133 | 12/2008 |
| GB | 2159542 | 12/1985 |
| JP | 64-055366 | 3/1989 |
| JP | 08-029571 | 2/1996 |
| JP | 2002-121630 | 4/2002 |
| JP | 2002-322553 | 11/2002 |
| JP | 2003-239060 | 8/2003 |
| JP | 2006-111902 | 4/2006 |
| JP | 2006-274386 | 10/2006 |
| JP | 2007-284704 | 11/2007 |
| KR | 2002-0077105 | 10/2002 |
| WO | 2007/119706 | 10/2007 |

* cited by examiner

*Primary Examiner* — Vera Katz
(74) *Attorney, Agent, or Firm* — Clark & Brody

(57) ABSTRACT

There is provided a Cr-containing austenitic alloy tube, wherein a chromium oxide film with a thickness of 0.05 to 1.5 μm having the relationship defined by Formula (i) is formed on the inner surface of the tube, wherein the average concentration of C in the depth range of 5 to 10 μm from the inner surface is lower than the concentration of C in a base metal;

$$0.4 \leq \delta_1/\delta_2 \leq 2.5 \qquad (i)$$

wherein $\delta_1$ and $\delta_2$ are thicknesses (μm) of the chromium oxide film at both ends of tube, respectively.

8 Claims, 1 Drawing Sheet

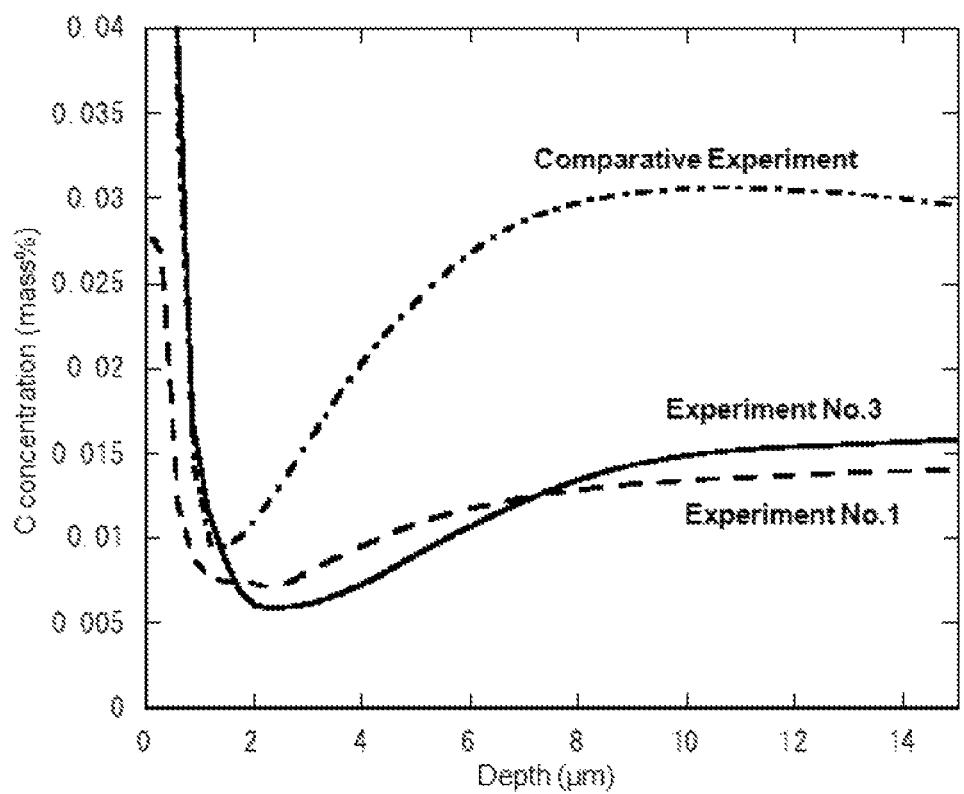

CR-CONTAINING AUSTENITIC ALLOY TUBE AND METHOD FOR PRODUCING THE SAME

TECHNICAL FIELD

The present invention relates to a Cr-containing austenitic alloy tube, in which Ni is eluted little even if the tube is used in a high-temperature water environment for a long period of time, and a method for producing the Cr-containing austenitic alloy tube. More particularly, the present invention relates to a Cr-containing austenitic alloy tube, which is suitably used as a member for a nuclear power plant and the like, and a method for producing the Cr-containing austenitic alloy tube.

BACKGROUND ART

A Cr-containing austenitic alloy tube has been used as various members because of being excellent in mechanical properties. In particular, since the members for a nuclear reactor is exposed to high-temperature water, a Cr-containing austenitic alloy tube excellent in corrosion resistance has been used as a member for a nuclear reactor. For example, as a member of a steam generator for a pressurized water reactor (PWR), a 60% Ni-30% Cr-10% Fe alloy or the like has been used.

These members are used in an environment of high-temperature water of about 300° C. which is a nuclear reactor water environment, for several years to several tens years. For the Cr-containing austenitic alloy tube used as a steam generator tubing for nuclear power plant, although Ni is contained much, and therefore the corrosion resistance is excellent and the corrosion rate is low, a minute amount of Ni is eluted from a base metal by the long-term use.

In a process in which reactor water circulates, the eluted Ni is carried to a reactor core and receives neutron irradiation in the vicinity of fuel. When receiving neutron irradiation. Ni is converted into radiocobalt by nuclear reaction. This radiocobalt continues to emit radioactive rays for a long period of time because the half-life thereof is very long. Therefore, if the elution amount of Ni is large, regular inspection cannot be started until the emitted radiation dose decreases to a proper level, so that the period of regular inspection extends, which results in an economic loss.

To reduce the exposure dose is a very important issue in using a light water reactor for a long period of time. So far, therefore, measures have been taken to prevent Ni in the Cr-containing austenitic alloy tube from elution by improving the corrosion resistance on the material side and by controlling the quality of reactor water.

Patent Document 1 discloses a method in which Ni-based alloy heat-transfer tube is annealed in the temperature range of 400 to 750° C. in an atmosphere having a degree of vacuum of $10^{-2}$ to $10^{-4}$ Torr to form an oxide film consisting mainly of chromium oxides, whereby the general corrosion resistance is improved.

Patent Document 2 discloses a method far producing a member for nuclear power plant, in which after the solution treatment of a Ni-based precipitation strengthened alloy, beating treatment is performed combinedly with at least part of age hardening treatment and oxide film forming treatment in an oxidizing atmosphere of $10^{-3}$ Torr to atmospheric pressure.

Patent Document 3 discloses a method for producing a Ni-based alloy product, in which a Ni-based alloy product is heat-treated in an atmosphere of hydrogen or a mixed atmosphere of hydrogen and argon, the atmosphere having a dew point of –60° C. to +20° C.

Patent Document 4 discloses a method for forming a chromium-rich layer by exposing an alloy workpiece containing Ni and Cr to a gas mixture of water vapor and at least one kind of nonoxidizing gases.

Patent Document 5 discloses a method of heat treatment in which an oxide film of two-layer structure for restraining the elution of Ni is produced reliably and efficiently on the inner surface of a Ni-based alloy tube in a high-temperature water environment. In this method, at least two gas feeding devices are provided on the exit side of a continuous heat treatment furnace, or one gas feeding device is provided on each of the exit side and the entrance side. The tube is charged into the furnace and held at a temperature of 650 to 1200° C. for 1 to 1200 minutes while feeding an atmospheric gas consisting of hydrogen or a mixed gas of hydrogen and argon, the atmospheric gas having a dew point in the range of –60° C. to +20° C., from the front end side in the travel direction into a work tube before being charged into the heat treatment furnace by using one device of the gas feeding devices and a gas introducing tube penetrating the interior of the furnace. In the above process, after the front end of tube has arrived at the exit side of furnace, an operation of changing over the feed of atmospheric gas into the interior of tube to the feed from the other gas feeding device is repeated.

Patent Document 6 discloses a method for producing a Ni-based alloy, in which a Ni-based alloy is treated in a heating treatment atmosphere consisting of carbon dioxide gas or an atmosphere consisting of at least one of 0.0001 vol % or more of carbon dioxide gas, 99.9999 vol % or less of hydrogen gas, and 99.9999 vol % or less of rare gas, whereby an oxide film consisting of chromium oxides is formed on the surface of the Ni-based alloy.

Patent Documents 7 and 8 disclose a method for producing a Cr-containing nickel-based alloy tube, in which the Cr-containing nickel-based alloy tube is treated in an atmosphere consisting of nonoxidizing gas containing carbon dioxide, whereby a chromium oxide film having an intended thickness is formed on the inner surface of tube.

LIST OF PRIOR ART DOCUMENTS

Patent Document

Patent Document 1: JP64-55366A
Patent Document 2: JP8-29571A
Patent Document 3: JP2002-121630A
Patent Document 4: JP2002-322553A
Patent Document 5: JP2003-239060A
Patent Document 6: JP2006-111902A
Patent Document 7: JP2007-284704A
Patent Document 8: WO2007/119706

DISCLOSURE OF THE INVENTION

Problems to be Solved by the Invention

The film formed by the method disclosed in Patent Document 1 has a problem that, if the film is damaged by the long-term use, an elution preventing effect is lost because the thickness of film is insufficient. The method disclosed in Patent Document 2 has a problem that oxidized Ni is easily incorporated into a film, and this Ni is eluted during the use. As the oxidizing gas for oxidizing a tube, water vapor, oxygen, and the like can be conceivable; however, it is thought that water vapor is most suitable from the viewpoint of safety, cost, and the like. The film provided on the tube is required to have a film thickness large enough to achieve, corrosion resistance, and is also required to have uniformity in the tube longitudinal direction and tube circumferential direction of the film thickness from the viewpoint of quality. However, the methods described in Patent Documents 3 to 5, in which an oxide film is formed by controlling the water vapor amount (dew point), cannot meet these requirements. This is because at the entrance at which a raw material of high concentration is supplied, the reaction rate is high and the film is thick, and the raw material is consumed as approaching the exit and the concentration of raw material decreases, so that the film becomes thin at the exit. In particular, water vapor has a high reactivity, and the oxidation of Ni-based alloy tube requires a high temperature (1000 to 1200° C.), so that the difference in reaction amount between the entrance and the exit is large, and it is difficult to form a uniform oxide film throughout the whole of tube. If the thickness of oxide film is too small, the effect of Ni elution resistance is not achieved; on the other hand, if the thickness of oxide film is too large, the film is liable to peel off and inversely the Ni elution resistance is deteriorated. According to the study conducted by the present inventors, the thickness of oxide film must be regulated in the range of micron order to submicron order.

To solve these problems, in Patent Documents 6 to 8, a gas condition in which carbon dioxide having a reactivity lower than that of water vapor is used as an oxidizing gas is adopted to aim at improvement in the uniformity of film. However, carbon dioxide generates harmful carbon monoxide after the oxidation of metal. Also, in some cases, the Ni-based alloy is carburized by the produced carbon monoxide depending on the condition. Therefore, it cannot be said that these methods provide safe and high-quality products.

The present inventors conducted studies earnestly, and found that the thickness of film of a long-length Cr-containing austenitic alloy tube can be controlled even if water vapor having a high reactivity is used by using safe and inexpensive water vapor as an oxidizing gas, by adopting a gas condition in which importance is attached to flow rate, and further by restricting the length and diameter of tube to be treated. As the result, the present inventors completed the present invention.

An objective of the present invention is to provide a Cr-containing austenitic alloy tube in which chromium oxides are formed on the surface of the Cr-containing austenitic alloy tube at a low cost and uniformly, and a method for producing the Cr-containing austenitic alloy tube.

Means for Solving the Problems

The present invention involves Cr-containing austenitic alloy tubes described in the following items (1) to (4) and the methods for producing the Cr-containing austenitic alloy tubes described in the following items (5) to (10).

(1) A Cr-containing austenitic alloy tube, wherein a chromium oxide film with a thickness of 0.05 to 1.5 μm having the relationship defined by Formula (i) is formed on the inner surface of the tube, wherein the average concentration of C in the depth range of 5 to 10 μm from the inner surface is lower than the concentration of C in a base metal.

$$0.4 \leq \delta 1/\delta 2 \leq 2.5 \quad (i)$$

wherein δ1 and δ2 are thicknesses (μm) of the chromium oxide film at both ends of tube, respectively.

(2) The Cr-containing austenitic alloy tube according to the item (i), wherein the tube has a length of 5 to 50 m and an inside diameter of 10 to 30 mm.

(3) The Cr-containing austenitic alloy tube according to the item (1) or (2), wherein the Cr-containing austenitic alloy tube consists of, by mass percent, C: 0.15% or less, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(4) The Cr-containing austenitic alloy tube according to any one of the items (1) to (3), wherein the Cr-containing austenitic alloy tube is used as a member for a nuclear power plant.

(5) A method for producing a Cr-containing austenitic alloy tube, wherein the Cr-containing austenitic alloy tube is heated with flowing a nonoxidizing gas containing water vapor through the inner surface of the tube, whereby a chromium oxide film with a thickness of 0.05 to 1.5 μm having the relationship defined by Formula (i) is formed on the inner surface of the tube.

$$0.4 \leq \delta 1/\delta 2 \leq 2.5 \quad (i)$$

wherein δ1 and δ2 are thicknesses (μm) of the chromium oxide film at both ends of tube, respectively.

(6) The method for producing a Cr-containing austenitic alloy tube according to the item (5), wherein the Cr-containing austenitic alloy tube is heated under the condition that the tube is held in the temperature range of 800 to 1200° C. for one minute or longer with flowing a nonoxidizing gas containing water vapor with a concentration of 250 to 25,000 ppm through the tube at a flow rate in the range of 6.0 to 50 L/min.

(7) The method for producing a Cr-containing austenitic alloy tube according to the item (5) or (6), wherein the Cr-containing austenitic alloy tube is configured so that the average concentration of C in the depth range of 5 to 10 μm from the inner surface is lower than the concentration of C in a base metal.

(8) The method for producing a Cr-containing austenitic alloy tube according to any one of the items (5) to (7), wherein the Cr-containing austenitic alloy tube has a length of 5 to 50 m and an inside diameter of 10 to 30 mm.

(9) The method for producing a Cr-containing austenitic alloy tube according to any one of the items (5) to (8), wherein the Cr-containing austenitic alloy tube consists of, by mass percent, C: 0.15% or less, Si: 1.00% or Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

(10) The method for producing a Cr-containing austenitic alloy tube according to any one of the items (5) to (9), wherein the Cr-containing austenitic alloy tube is used as a member for a nuclear power plant.

The "chromium oxide film" means an oxide film consisting mainly of $Cr_2O_3$, and may contain oxides other than $Cr_2O_3$, such as $MnCr_2O_4$, $TiO_2$, $Al_2O_3$, and $SiO_2$. Also, if an oxide film consisting of chromium oxides is provided on the surface of the Cr-containing austenitic alloy tube, any other oxide layer may be formed on the upper layer (outside layer) and/or the lower layer (inside layer) of the chromium oxide layer.

Advantageous Effects of the Invention

According to the present invention, a chromium oxide film can be formed on the inner surface of the Cr-containing austenitic alloy tube at a low cost and uniformly. The Cr-containing austenitic alloy tube produced by the method in accordance with the present invention can be used best suitably as a member that is used in high-temperature water, such as a steam generator tubing, especially as a member for nuclear power plant because Ni is eluted very little even if the Cr-containing austenitic alloy tube is used in a high-temperature water environment, for example, in a high-temperature water environment in a nuclear power plant for a long period of time.

BRIEF DESCRIPTION OF THE DRAWINGS

FIG. 1 is a graph showing C concentrations in the outer layer portion on the tube inner surface side.

MODE FOR CARRYING OUT THE INVENTION

1. Thickness of Film Formed on Inner Surface of Tube

Since the Ni elution resistance depends on the thickness of a chromium oxide film, the film thickness must be controlled. If the film thickness is smaller than 0.05 μm, the Ni elution resistance is insufficient. Although the corrosion resistance is achieved by forming a film with thickness of 0.05 μm or larger, the film thickness is preferably 0.1 μm or larger. On the other hand, for a high-Ni alloy in which the Ni content exceeds 40%, the film thickness is preferably 0.2 μn or larger, further preferably 0.3 μm or larger.

However, the increase of film thickness likely to lead the abrasion of film and the abrasion occurs remarkably if the thickness exceeds 1.5 μm. Therefore, the film thickness is made 1.5 μm or smaller. The upper limit of film thickness is preferably 0.95 μm, further preferably 0.85 μm.

2. Variations in Film Thickness

If the variations in film thickness in the longitudinal direction of tube are large, and a film having a small thickness is formed locally, the Ni elution amount increases in that area. Therefore, the variations in film thickness are preferably minimized. That is, the thickness of chromium oxide film should satisfy the relationship defined by Formula (i).

$$0.4 \leq \delta 1/\delta 2 \leq 2.5 \quad \text{(i)}$$

in which $\delta 1$ and $\delta 2$ are thicknesses (μm) of the chromium oxide film at both ends of tube, respectively.

Formula (i) is preferably $$0.5 \leq \delta 1/\delta 2 \leq 2.0$$

further preferably $$0.70 \leq \delta 1/\delta 2 < 1.55$$

In the film forming treatment of the Cr-containing austenitic alloy tube, since the tube is heat-treated at the length of product to be shipped, after the heat treatment, specimens are cut out of both the end portions of product tube, and the film thicknesses are determined.

3. Atmospheric Gas Fed into Tube

In the method for producing the Cr-containing austenitic alloy tube of the present invention, a chromium oxide film is formed on the inner surface of the Cr-containing austenitic alloy tube by heating the Cr-containing austenitic alloy tube by using an atmospheric gas consisting of water vapor and nonoxidizing gas.

In order to oxidize only chromium present on the inner surface of tube, it is necessary to make the interior of tube a low oxygen potential environment. It is thought that, in such an environment, the feed of oxidizing gas determines the rate of oxidation reaction. On the other hand, when the atmospheric gas is fed into the tube, a concentration gradient occurs, and it is thought that the gas diffusibility at this time depends on the concentration of oxidizing gas and the flow rate of atmospheric gas. The feed of oxidizing gas depends on the gas diffusibility, and therefore it can be thought that the feed of oxidizing gas also depends on the concentration of oxidizing gas and the flow rate of atmospheric gas.

For example, in the case where carbon dioxide gas is used as the oxidizing gas or in the case where an organic substance such as oil adheres to the inner wall of tube, if a gas having a C source comes into contact with and reacts with the surface of alloy, the concentration of C in the outer layer of alloy is sometimes very slightly higher than the concentration of C in the base metal. If the concentration of C increases, the grain boundary strength of the outer layer portion enhances, so that stress corrosion cracking may occur in the present invention, it is defined that the average concentration of C in the depth range of 5 to 10 μm from the inner surface is lower than the concentration of C in the base metal. The average concentration of C in the depth range of 5 to 10 μm from the inner surface is a value obtained by calculating the concentrations in the range of 5 to 10 μm at pitches of 0.1 μm or smaller in the conventional depth analysis (GDS, XPS, SIMS), and by averaging these calculated concentrations. Also, to obtain the concentration of C in the base metal, an analysis value obtained by the infrared absorption method after high-frequency combustion using a chip specimen sampled from the wall thickness central portion of tube is used. In order to obtain the alloy outer layer portion having such a C concentration, it is preferable that an atmospheric gas containing water vapor be used as the atmospheric gas fed into the tube, and further the interior of tube be cleaned (for example, degreased) in advance.

The concentration of carbon dioxide gas in the atmospheric gas is preferably restricted to low level. When carbon dioxide is mixed in as an impurity, the amount thereof is preferably 50 ppm or smaller.

In the present invention, by making the water vapor concentration in the atmospheric gas and the flow rate of the atmospheric gas in a proper range, an oxide film having a uniform film thickness can be formed.

<Atmospheric Gas>

If being contained even in a minute amount, water vapor forms the chromium oxide film. Therefore, the lower limit thereof is not defined especially. However, if 250 ppm or more of water vapor is contained, the effect thereof becomes remarkable. The upper limit of water vapor concentration is not defined especially; however, the water vapor concentration is preferably 25,000 ppm or less from the viewpoint of reducing the production cost.

Further, in the present invention, as the oxidizing gas, oxygen may be fed partially in addition to water vapor. Like water vapor, oxygen can form the chromium oxides. The content of oxygen gas is preferably 10,000 ppm or less. This is because, if oxygen is contained in a large amount, the formation of chromium oxide film is accelerated, and the Cr concentration in the base metal is decreased, so that the corrosion resistance is deteriorated. If being contained even in a minute amount, oxygen achieves the above-described effect. Therefore, the lower limit thereof is not defined especially; however, the effect thereof becomes remarkable when 0.0001 vol % or more of oxygen is contained.

As the nonoxidizing gas, for example, hydrogen gas, rare gas (Ar, He, etc.), carbon monoxide gas, nitrogen gas, hydrocarbon gas, and the like are cited. When carbon monoxide gas, nitrogen gas, or hydrocarbon gas of these nonoxidizing gases is used, there is a fear of carburizing and nitriding. Therefore, at least one kind of hydrogen gas and rare as is preferably contained.

Hydrogen gas is often used as an atmospheric gas for heat treatment on an industrial scale. If this gas is used for dilution of water vapor gas, the production cost can be reduced. Therefore, it is most favorable that heat treatment is performed with the atmospheric gas being a gas atmosphere consisting of water vapor gas and hydrogen gas.

When hydrogen as is used at least partially, by feeding oxygen as an oxidizing gas, hydrogen and oxygen are caused to react with each other to produce water, and water may be used for oxidation of tube. In this case, attention must be paid to explosion.

The concentration of atmospheric gas in the case where water vapor is contained can be controlled by regulating the water vapor concentration by dew point control after the concentrations of water vapor gas and nonoxidizing gas or further oxygen gas have been regulated. Also, after the dew point has been regulated by using the nonoxidizing gas, water vapor gas or further oxygen gas may be added.

<Flow Rate of Atmospheric Gas Fed into Tube Inner Surface>

The flow rate of atmospheric gas fed into the inner surface of tube is preferably 6.0 to 50 L/min. If the flow rate thereof is lower than 6.0 L/min, even if the water vapor concentration and the heating condition are regulated, an oxide film having a desired thickness cannot be formed. On the other hand, if the flow rate thereof exceeds 50 L/min, inversely, the oxide film becomes excessively thick.

4, Length and Inside Diameter of Tube

The Cr-containing austenitic alloy tube produced at the water vapor concentration and under the heat treatment conditions defined in the present invention is suitable as a steam generator tubing for nuclear power plant having a tube length of 5 to 50 m and a tube inside diameter of 10 to 30 mm.

In the case where the atmospheric gas is a highly diffusible gaseous mixture of water vapor and nonoxidizing gas, the film thickness tends to vary greatly. In the present invention, even if the atmospheric gas is a gaseous mixture of water vapor and nonoxidizing gas, the variations in the oxide film thickness on the inner surface of tube can be reduced by properly regulating the water vapor concentration and the gas flow rate according to the length and inside diameter of tube.

5. Heat Treatment Temperature and Heat Treatment Time

The heat treatment temperature and heat treatment time are not limited. However, for example, the heating temperature can be in the range of 800 to 1200° C. and the heating time can be in the range of one minute or longer. The reasons for restrictions are as described below.

<Heating Temperature>

The heating temperature may be in such a range that the proper thickness and composition of oxide film and the strength characteristics of alloy can be attained. Specifically, when the heating temperature is lower than 800° C., the oxidation of chromium may be insufficient. In order to obtain a film having a proper thickness in a proper time period, the heating temperature is preferably 900° C. or higher, further preferably 1000° C. or higher. On the other hand, the upper limit of heating temperature is 1200° C. If the heating temperature exceeds 1200° C., there is a risk that the strength of the Cr-containing austenitic alloy tube material cannot be ensured. Therefore, the heating temperature should be in the range of 800 to 1200° C.

<Heating Time>

The heating time may be set in such a range that proper thickness and composition of oxide film can be attained. That is, in order to form an oxide film consisting mainly of chromium oxides, it is desirable to heat the tube for one minute or longer. The upper limit of heating time is not defined especially. However, at least in the preferable heating temperature range of 800 to 1200° C. of the present invention, even if the tube is heated for a time period exceeding 24 hours, an oxide film is scarcely produced, and such heating time is disadvantageous in terms of production cost as well. Therefore, the heating time should be in the range of one minute to 24 hours.

In the case where the film forming treatment is performed in a continuous heat treatment furnace, it is necessary that the heating time be shortened to improve the productivity. The higher the heating temperature is, the shorter the heating time can be made. Therefore, in order to form a film having the thickness of the present invention, the heating temperature is in the range of 1000 to 1200° C., and the heating time is preferably in the range of one to 60 minutes, further preferably in the range of one to 20 minutes.

6. Chemical Composition of Material Tube for Cr-Containing Austenitic Alloy Tube The chemical composition of a material tube for the Cr-containing austenitic alloy tube for the production method of the present invention should be, for example, by mass percent, C: 0.15% or less, Si: 1.00% or less, Mn: 2.0% or less, P: 0.030% or less, 0.030% or less, Cr: 10.0 to 40.0%, Ni: 8.0 to 80.0%, Ti: 0.5% or less, Cu: 0.6% or less, Al: 0.5% or less, and N: 0.20% or less, the balance being Fe and impurities.

The "impurities" are herein elements that mixedly enter on account of various factors in the production process including raw materials such as ore or scrap when an alloy is produced on an industrial scale, and are allowed to be contained within the range such that the elements do not exert an adverse influence on the present invention.

The reason why the content of each element is restricted is explained below. In the explanation below, the symbol "%" of the content of each element means "mass percent".

C: 0.15% or Less

C (carbon) may deteriorate the stress corrosion cracking resistance if being contained exceeding 0.15%. Therefore, if C is contained, the content thereof is preferably 0.15% or less, further preferably 0.06% or less. On the other hand, C has an effect of enhancing the grain boundary strength of alloy. In order to achieve this effect, it is preferable that the C content is 0.01% or more.

Si: 1.00% or Less

Si (silicon) is used as a deoxidizer at the time of smelting, and remains in the alloy as an impurity. At this time, the Si content should be restricted to 1.00% or less. If the Si content exceeds 0.50%, the cleanliness of alloy may decrease. Therefore, the Si content is preferably restricted to 0.50% or less.

Mn: 2.0% or Less

Mn (manganese) decreases the corrosion resistance of alloy if being contained exceeding 2.0%. Therefore, the Mn content is preferably 2.0% or less, further preferably 1.0% or less. As compared with Cr, Mn has a low free energy for formation of oxides, and precipitates as $MnCr_2O_4$ due to heating. Also, since the diffusion velocity is relatively high, usually, $Cr_2O_3$ is produced preferentially in the vicinity of base metal by heating, and on the outside thereof. $MnCr_2O_4$ is formed as an upper layer. If the $MnCr_2O_4$ layer is present, the $Cr_2O_3$ layer is protected in the service environment, and even if the $Cr_2O_3$ layer is broken for any reason, the restoration of $Cr_2O_3$ is accelerated by $MnCr_2O_4$. Such an effect becomes remarkable when 0.1% or more of Mn is contained.

P: 0.030% or Less

P (phosphorus) is an element that is present in the alloy as an impurity. If the P content exceeds 0.030%, the corrosion resistance may be adversely affected. Therefore, the P content is preferably restricted to 0.030% or less.

S: 0.030% or Less

S (sulfur) is an element that is present in the alloy as an impurity. If the S content exceeds 0.030%, the corrosion resistance may be adversely affected. Therefore, the S content is preferably restricted to 0.030% or less.

Cr: 10.0 to 40.0%

Cr (chromium) is an element necessary for producing an oxide film consisting of chromium oxides. In order to produce such an oxide film on the surface of alloy, it is desirable to contain 10.0% or more of Cr. However, if the Cr content exceeds 40.0%, the workability may be deteriorated. Therefore, the Cr content is preferably 10.0 to 40.0%.

Ni: 8.0 to 80.0%

Ni (nickel) is an element necessary for ensuring the corrosion resistance of the Cr-containing austenitic alloy, and 8.0% or more of Ni is preferably contained. On the other hand, since Ni is expensive, the minimum necessary amount of Ni has only to be contained depending on the intended use, and the Ni content is preferably 80.0% or less.

Ti: 0.5% or Less

Ti (titanium) may decrease the cleanliness of alloy if the content thereof exceeds 0.5%. Therefore, the Ti content is preferably 0.5% or less, further preferably 0.4% or less. However, it is desirable to contain 0.1% or more of Ti from the viewpoints of improvement in workability of alloy and restraint of grain growth at the time of welding.

Cu: 0.6% or Less

Cu (copper) is an element that is present in the alloy as an impurity. If the Cu content exceeds 0.6%, the corrosion resistance of alloy may decrease. Therefore, it is desirable to restrict the Cu content to 0.6% c less.

Al: 0.5% or Less

Al (aluminum) is used as a deoxidizer at the time of steel making, and remains in the alloy as an impurity. The remaining Al turns to be an oxide-base inclusion in the alloy, decreases the cleanliness of alloy, and may exert an adverse influence on the corrosion resistance and mechanical properties of alloy. Therefore, it is desirable to restrict the Al content to 0.5% or less.

N: 0.20% or Less

N (nitrogen) need not be contained, but about 0.01% of N is usually contained as an impurity in the Cr-containing austenitic alloy, which is an object of the present invention. However, if N is added positively, the strength can be enhanced without deteriorating the corrosion resistance. On the other hand, if the N content exceeds 0.20%, the corrosion resistance decreases. Therefore, the upper limit of the content of N, if contained, is 0.20%.

Among the above Cr-containing austenitic alloys, especially, a nickel-based alloy having a chemical composition of C: 0.15% or less, Si: 1.00% or less, Mn: 2.0% or less, P=0.030% or less, S: 0.030% or less, Cr: 10.0 to 40.0%, Ni: 45.0 to 80.0%, Ti: 0.5% or less, Cu: 0.5% or less, and Al: 0.5% or less, the balance being Fe and impurities, is preferable. This is because this alloy is further excellent in corrosion resistance.

Two kinds of Cr-containing nickel-based alloy tubes having the typical chemical compositions are as follows:

(a) A Cr-containing nickel-based alloy tube consisting of C: 0.15% or less, is 1.00% or less, Mn: 2.0% or less, P: 0.030% or less, S: 0.030% or less, Cr: 14.0 to 17.0%, Fe: 6.0 to 10.0%, Ti: 0.5% or less, Cu: 0.5% or less, and Al: 0.5% or less, the balance being Ni and impurities.

(b) A Cr-containing nickel-based alloy tube consisting of C: 0.06% or less, Si: 1.00% or less, Mn: 2.0% or less, P: 0.030% or less, S: 0.030% or less, Cr: 27.0 to 31.0%, Fe: 7.0 to 11.0%, Ti: 0.5% or less, Cu: 0.5% or less, and Al: 0.5% or less, the balance being Ni and impurities.

The alloy of the item (a) is an alloy excellent, in corrosion resistance in an environment containing chlorides because of containing 14.0 to 17.0% of Cr and 70 to 80% of Ni. In this alloy, the Fe content is preferably 6.0 to 10.0% from the viewpoint of the balance between the Ni content and the Cr content.

The alloy of the item (b) is an alloy excellent in corrosion resistance not only in an environment containing chlorides but also in an environment of pure water and alkali at high temperatures because of containing 27.0 to 31.0% of Cr and 55 to 65% of Ni. In this alloy as well, the Fe content is preferably 7.0 to 11.0% from the viewpoint of the balance between the Ni content and the Cr content.

7. Method for Producing Material Tube for Cr-Containing Austenitic Alloy Tube

The method for producing a material tube for the Cr-containing austenitic alloy tube, which is an object of the present invention, is carried out as described below. After a raw material having a predetermined chemical composition has been melted to produce an ingot, a Cr-containing austenitic alloy tube is usually produced through the steps of hot working and annealing or the steps of hot working, cold working, and annealing. Further, to improve the corrosion resistance of base metal, a special heat treatment called thermal treatment is sometimes performed.

The heat treatment of the present invention may be performed after the annealing treatment, or may be performed combinedly with the annealing treatment. If the heat treatment is performed combinedly with the annealing treatment, a heat treatment step for forming the oxide film need not be added to the conventional production process, so that the production cost does not increase. Also, in the case where thermal treatment is performed after annealing as described above, the thermal treatment may be performed combinedly with the heat treatment for forming the oxide film. Further, both of annealing treatment and thermal treatment may be performed as a treatment for forming the oxide film.

EXAMPLE 1

A material tube used for an experiment was produced by the producing method described below. First, an alloy having the chemical composition given in Table 1 was melted and cast to obtain an ingot. This ingot was hot-forged to produce a billet, and thereafter a tube was formed by a hot extrusion tube-making process. The tube thus obtained was cold-rolled by using a cold pilger mill so as to have an outside diameter of 25.0 mm and a wall thickness of 1.65 mm. Next, this cold-rolled tube was annealed in an hydrogen atmosphere of 1100° C., and thereafter was finished, by the cold drawing method, to a tube having a product size of 19.0 mm in outside diameter, 1.0 mm in wall thickness, and 20,000 mm in length (reduction of area=53%). Subsequently, the finished tube was cut to a necessary length, and thereafter the inner and outer surfaces of each tube were washed with an alkali degreasing liquid and rinse water, and the inner surface was further washed with acetone.

TABLE 1

| | Chemical composition (in mass %, balance: Fe and impurities) | | | | | | | | | | |
|---|---|---|---|---|---|---|---|---|---|---|---|
| Alloy | C | Si | Mn | P | S | Cr | Ni | Ti | Cu | Al | N |
| A | 0.019 | 0.22 | 0.26 | 0.008 | 0.001 | 29.4 | 59.2 | 0.25 | 0.25 | 0.24 | 0.01 |

While an atmospheric gas having a predetermined flow rate was fed to the obtained tube via a header, the tube was heated in a heating furnace while being moved, whereby a chromium oxide film was firmed on the inner surface of tube.

Both ends of the heat-treated tube were cut, and the film composition was examined by using an energy dispersive X-ray micro-analyzer (EDX). As the result, it was found that an oxide film consisting of chromium oxides had been formed. The film was analyzed by using glow discharge optical emission spectroscopy (GDS), and the thickness from the outermost surface to a position at which the intensity of peak of observed oxygen reduced by half was defined as a film thickness. Taking the thicknesses at the gas inlet and the gas outlet as $\delta 1$ and $\delta 2$, respectively, and taking a variation in thickness at both ends as $\delta 1/\delta 2$, evaluation was carried out. The evaluation results are given in Table 2

In comparative experiment, the austenitic alloy tube was treated at a heating temperature of 1100° C. for a holding time of five minutes with flowing hydrogen containing 5,600 ppm of carbon dioxide gas at a flow rate of 9.0 L/min, and a chromium oxide film was formed on the surface thereof.

In both of experiment Nos. 1 and 3 of the present invention, it is apparent that each of the average C concentration was 0.013% in the depth range of 5 to 10 μm from the inner surface, and lower than the concentration of base metal of 0.019%. In contrast, if carbon dioxide gas was used as an oxidizing gas, the result was such that the average C concentration in the surface layer was 0.027%, which is higher than the C concentration of base metal of 0.019%. If C is present exceeding the base metal concentration of C contained to enhance the grain boundary strength, a possibility of occurring stress corrosion cracking becomes high. In the water

TABLE 2

| | | | | | Heating | 1000° C. | Results | | | |
|---|---|---|---|---|---|---|---|---|---|---|
| | Concen- | Flow | Tube | Tube | temper- | holding | Film thickness | | Thickness | C concentration |
| Test No. | tration (ppm) | rate (L/min) | length (m) | diameter (mm) | ature (° C.) | time (min) | entrance side (μm) | exit side (μm) | distribution ($\delta 1/\delta 2$) | (mass %) Surface** |
| 1 | 3000 | 10 | 20 | 17 | 1100 | 5 | 0.70 | 0.60 | 1.2 | 0.013 |
| 2 | 6000 | 10 | 20 | 17 | 1100 | 5 | 1.03 | 0.68 | 1.5 | 0.012 |
| 3 | 9000 | 10 | 20 | 17 | 1100 | 5 | 1.05 | 0.98 | 1.1 | 0.013 |
| 4 | 3960 | 18 | 20 | 17 | 1100 | 5 | 0.74 | 0.61 | 1.2 | 0.011 |
| 5 | 3960 | 12 | 20 | 17 | 1100 | 5 | 0.74 | 0.54 | 1.4 | 0.013 |
| 6 | 3960 | 6.0 | 20 | 17 | 1100 | 5 | 0.74 | 0.30 | 2.5 | 0.017 |
| 7 ‡ | 3960 | 4.5* | 20 | 17 | 1100 | 5 | 0.74 | 0.10 | 7.4* | 0.015 |
| 8 ‡ | 240* | 10 | 20 | 17 | 1100 | 5 | 0.07 | 0.02* | 3.5* | 0.014 |
| 9 | 16800 | 6.0 | 20 | 17 | 1100 | 5 | 1.40 | 1.14 | 1.2 | 0.009 |
| 10 ‡ | 9000 | 5.6* | 20 | 17 | 1100 | 5 | 1.10 | 0.40 | 2.8* | 0.009 |
| 11 | 1000 | 10 | 20 | 17 | 1100 | 5 | 0.31 | 0.13 | 2.4 | 0.015 |
| 12 | 500 | 30 | 20 | 17 | 1100 | 5 | 0.18 | 0.13 | 1.4 | 0.015 |
| 13 | 24800 | 10 | 20 | 17 | 1100 | 5 | 1.50 | 1.32 | 1.1 | 0.009 |
| 14 | 2240 | 9.8 | 20 | 17 | 1100 | 5 | 0.53 | 0.29 | 1.8 | 0.012 |
| 15 | 4560 | 6.0 | 20 | 17 | 1100 | 5 | 0.80 | 0.36 | 2.2 | 0.013 |

‡ indicates comparative examples.
*indicates that conditions do not satisfy those defined by the present invention.
**indicates the average concentration of C in the depth range of 5 to 10 μm from the surface layer at the tube inner surface side.

From Table 2, it is apparent that the average film thickness of example embodiment of the present invention is in the range of 0.05 to 1.5 μm, and the film thickness distribution falls into an intended range. Also, it is apparent that by regulating the flow rate and water vapor concentration of the atmospheric gas to the range defined in the present invention, proper film thickness range and distribution can be obtained even by water vapor treatment. In particular, if the flow rate of atmospheric gas is 6.0 L/min or higher, an oxide film having an intended film thickness and thickness distribution can be formed in a wide range of water vapor concentration.

FIG. 1 shows the results of distribution of C concentration obtained by using GDS in experiment Nos. 1 and 3 and comparative, experiments.

vapor treatment, the C concentration decreases properly in the vicinity of the surface, so that the tube can be used more safely as a product material.

EXAMPLE 2

Next, to examine the influence of parameter. Cr-containing austenitic alloy tubes having changed tube diameter and tube length were prepared, and a chromium oxide film was formed under the conditions given in Table 3 by using the same method as that of Example 1. The results are given in Table 3.

TABLE 3

| Test No. | Concentration (ppm) | Flow rate (L/min) | Tube length (m) | Tube diameter (mm) | Heating temperature (°C.) | 1000° C. holding time (min) | Film thickness entrance side (μm) | Film thickness exit side (μm) | Thickness distribution (δ1/δ2) | C concentration (mass %) Surface** |
|---|---|---|---|---|---|---|---|---|---|---|
| 16 | 2750 | 18 | 20 | 10 | 1100 | 5 | 0.60 | 0.51 | 1.2 | 0.012 |
| 17 | 2750 | 18 | 20 | 17 | 1100 | 5 | 0.60 | 0.43 | 1.4 | 0.014 |
| 18 | 2750 | 18 | 20 | 25.4 | 1100 | 5 | 0.60 | 0.33 | 1.8 | 0.016 |
| 19 | 2750 | 18 | 20 | 30 | 1100 | 5 | 0.60 | 0.28 | 2.1 | 0.016 |
| 20 | 1980 | 12 | 20 | 12.5 | 1100 | 5 | 0.49 | 0.29 | 1.7 | 0.016 |
| 21 | 7500 | 10.0 | 20 | 14.5 | 1100 | 5 | 1.06 | 0.84 | 1.3 | 0.010 |
| 22 | 3960 | 12.0 | 10 | 17 | 1100 | 5 | 0.78 | 0.64 | 1.2 | 0.018 |
| 23 | 3960 | 12 | 20 | 17 | 1100 | 5 | 0.74 | 0.54 | 1.4 | 0.013 |
| 24 | 3960 | 12.0 | 30 | 17 | 1100 | 5 | 0.74 | 0.50 | 1.5 | 0.014 |

**indicates the average concentration of C in the depth range of 5 to 10 μm from the surface layer at the tube inner surface side.

Table 3 indicates that if the heat treatment conditions defined in the present invention were satisfied, the average film thickness of the obtained chromium oxide film was within the range of 0.05 to 1.5 μm, and the film thickness distribution also fell into the intended range. If the inside diameter of tube is within the range of 10 to 30 mm, a Cr-containing austenitic alloy tube provided with a chromium oxide film having proper film thickness range and distribution can be prepared. Further, concerning the influence of tube length, by properly regulating the concentration of water vapor and the flow rate of atmospheric gas, even if the tube is as long as 30 in, a chromium oxide film such that both of the film thickness range and distribution fall into the defined range of the present invention can be formed in the tube.

EXAMPLE 3

An alloy tube (tube length: 20 m, tube diameter: 17 mm) having the chemical composition given in Table 4 was oxidized with water vapor, and thereby a chromium oxide film was formed. The film forming conditions were set in the same way as in experiment No. 5. That is, hydrogen containing 3,960 ppm of water vapor was flowed at a flow rate of 12 L/min as an atmospheric gas, and the heat treatment temperature was set at 1100° C. and the treatment time was set at five minutes. The measurement results of film thickness and C concentration of a specimen after treatment are given in Table 5.

TABLE 4

| Alloy | Chemical composition (in mass %, balance: Fe and impurities) | | | | | | | | | | |
| | C | Si | Mn | P | S | Cr | Ni | Ti | Cu | Al | N |
|---|---|---|---|---|---|---|---|---|---|---|---|
| B | 0.031 | 0.29 | 0.30 | 0.008 | <0.001 | 16.1 | 72.5 | 0.21 | 0.02 | 0.11 | 0.02 |
| C | 0.020 | 0.47 | 0.60 | 0.007 | <0.001 | 21.3 | 34.3 | — | 0.02 | — | 0.01 |
| D | 0.061 | 0.39 | 1.54 | 0.022 | 0.001 | 18.5 | 10.0 | — | 0.02 | — | 0.02 |

TABLE 5

| Alloy | Film thickness entrance side (μm) | Film thickness exit side (μm) | Thickness distribution (δ1/δ2) | C concentration (mass %) Surface** |
|---|---|---|---|---|
| A | 0.74 | 0.54 | 1.4 | 0.013 |
| B | 0.70 | 0.44 | 1.6 | 0.019 |

TABLE 5-continued

| Alloy | Film thickness entrance side (μm) | Film thickness exit side (μm) | Thickness distribution (δ1/δ2) | C concentration (mass %) Surface** |
|---|---|---|---|---|
| C | 0.80 | 0.50 | 1.6 | 0.015 |
| D | 0.75 | 0.47 | 1.6 | 0.042 |

**indicates the average concentration of C in the depth range of 5 to 10 μm from the surface layer at the tube inner surface side.

Compared with the result for alloy A in Examples 1 to 3, for alloys B, C and D, substantially equivalent results were obtained in both of film thickness and distribution. Also, for the alloys having any chemical composition, it was confirmed that the average C concentration in the surface layer was lower than the C concentration of base metal.

Industrial Applicability

According to the present invention, a Cr-containing austenitic alloy tube in which a chromium oxide film is formed at a low cost and uniformly on the inner surface of tube can be obtained. Even if the Cr-containing austenitic alloy tube is used in a high-temperature water environment, for example, in a nuclear power plant for a long period of time, the elution of Ni is very little. Therefore, the Cr-containing austenitic alloy tube is best suitable as a member used in high-temperature water, such as a steam generator tubing, especially as a member for nuclear power plant.

What is claimed is:

1. A Cr-containing austenitic alloy tube exhibiting corrosion resistance and enhanced strength, wherein the Cr-containing austenitic alloy tube consists of, by mass percent, C: 0.01 to 0.15%, Si: 1.00% or less, Mn: 2.0% or less, P: 0.030% or less, S: 0.030% or less, Cr: 10.0 to 40.0%, Ni: 8.0 to 80.0%, Ti: 0.5% or less, Cu: 0.6% or less, Al: 0.5% or less, and N: 0.01 to 0.20%, a balance being Fe and impurities, and wherein a chromium oxide film with a thickness of 0.05 to 1.5 μm having a relationship defined by Formula (i) is formed on an inner surface of the tube, wherein an average concentration of C in a depth range of 5 to 10 μm from the inner surface is lower than a concentration of C in a wall thickness central portion of the tube;

$$0.4 \leq \delta1/\delta2 \leq 2.5 \quad (i)$$

wherein δ1 and δ2 are thicknesses (μm) of the chromium oxide film at both ends of tube, respectively.

2. The Cr-containing austenitic alloy tube according to claim 1, wherein the tube has a length of 5 to 50 m and an inside diameter of 10 to 30 mm.

3. The Cr-containing austenitic alloy tube according to claim 2, wherein the Cr-containing austenitic alloy tube is used as a member for a nuclear power plant.

4. A method for producing a Cr-containing austenitic alloy tube described in claim 3, wherein the Cr-containing austenitic alloy tube is heated under the condition that the tube is held in the temperature range of 800 to 1200° C. for one minute or longer with flowing a nonoxidizing gas containing water vapor with a concentration of 250 to 25,000 ppm through the tube at a flow rate in the range of 6.0 to 50 L/min.

5. A method for producing a Cr-containing austenitic alloy tube described in claim 2, wherein the Cr-containing austenitic alloy tube is heated under the condition that the tube is held in the temperature range of 800 to 1200° C. for one minute or longer with flowing a nonoxidizing gas containing water vapor with a concentration of 250 to 25,000 ppm through the tube at a flow rate in the range of 6.0 to 50 L/min.

6. The Cr-containing austenitic alloy tube according to claim 1, wherein the Cr-containing austenitic alloy tube is used as a member for a nuclear power plant.

7. A method for producing a Cr-containing austenitic alloy tube described in claim 6, wherein the Cr-containing austenitic alloy tube is heated under the condition that the tube is held in the temperature range of 800 to 1200° C. for one minute or longer with flowing a nonoxidizing gas containing water vapor with a concentration of 250 to 25,000 ppm through the tube at a flow rate in the range of 6.0 to 50 L/min.

8. The method for producing a Cr-containing austenitic alloy tube according to claim 1, wherein the Cr-containing austenitic alloy tube is heated under the condition that the tube is held in the temperature range of 800 to 1200° C. for one minute or longer with flowing a nonoxidizing gas containing water vapor with a concentration of 250 to 25,000 ppm through the tube at a flow rate in the range of 6.0 to 50 L/min.

* * * * *